US011314969B2

(12) United States Patent
Yang et al.

(10) Patent No.: US 11,314,969 B2
(45) Date of Patent: Apr. 26, 2022

(54) SEMANTIC PAGE SEGMENTATION OF VECTOR GRAPHICS DOCUMENTS

(71) Applicant: Adobe Inc., San Jose, CA (US)

(72) Inventors: Xiao Yang, San Jose, CA (US); Paul Asente, Redwood City, CA (US); Mehmet Yumer, San Jose, CA (US)

(73) Assignee: Adobe Inc., San Jose, CA (US)

( * ) Notice: Subject to any disclaimer, the term of this patent is extended or adjusted under 35 U.S.C. 154(b) by 142 days.

(21) Appl. No.: 16/777,258

(22) Filed: Jan. 30, 2020

(65) Prior Publication Data

US 2020/0167558 A1 May 28, 2020

Related U.S. Application Data

(63) Continuation of application No. 15/656,269, filed on Jul. 21, 2017, now Pat. No. 10,599,924.

(51) Int. Cl.
| | | |
|---|---|---|
| *G06K 9/00* | (2006.01) | |
| *G06K 9/62* | (2006.01) | |
| *G06K 9/34* | (2006.01) | |
| *G06N 3/08* | (2006.01) | |
| *G06K 9/32* | (2006.01) | |
| *G06N 3/04* | (2006.01) | |

(52) U.S. Cl.
CPC ..... *G06K 9/00456* (2013.01); *G06K 9/00463* (2013.01); *G06K 9/3233* (2013.01); *G06K 9/34* (2013.01); *G06K 9/627* (2013.01); *G06K 9/6256* (2013.01); *G06N 3/0454* (2013.01); *G06N 3/08* (2013.01); *G06K 2209/01* (2013.01); *G06N 3/0481* (2013.01)

(58) Field of Classification Search
CPC .......... G06K 9/00456; G06K 9/00463; G06K 9/00442; G06K 9/00449; G06N 3/0454; G06N 3/08; G06N 20/00; G06F 40/30; G06T 7/11
See application file for complete search history.

(56) References Cited

U.S. PATENT DOCUMENTS

| | | | |
|---|---|---|---|
| 10,599,924 B2 * | 3/2020 | Yang | G06K 9/34 |
| 10,810,491 B1 * | 10/2020 | Xia | G06N 3/08 |
| 2014/0245122 A1 * | 8/2014 | Oro | G06F 40/30 |
| | | | 715/230 |

OTHER PUBLICATIONS

J. Schurmann, N. Bartneck, T. Bayer, J. Franke, E. Mandlerand M. Oberlander, "Document analysis-from pixels to contents," in Proceedings of the IEEE, vol. 80, No. 7, pp. 1101-1119, Jul. 1992, doi: 10.1109/5.156473. (Year: 1992).*

* cited by examiner

*Primary Examiner* — Ross Varndell
(74) *Attorney, Agent, or Firm* — Kilpatrick Townsend & Stockton LLP

(57) ABSTRACT

Disclosed systems and methods categorize text regions of an electronic document into document object types based on a combination of semantic information and appearance information from the electronic document. A page segmentation application executing on a computing device provides a textual feature representation and a visual feature representation to a neural network. The application identifies a correspondence between a location of the set of pixels in the electronic document and a location of a particular document object type in an output page segmentation. The application further outputs a classification of the set of pixels as being the particular document object type based on the identified correspondence.

20 Claims, 8 Drawing Sheets

SEMANTIC PAGE SEGMENTATION OF VECTOR GRAPHICS DOCUMENTS

CROSS-REFERENCE TO RELATED APPLICATIONS

This application is a continuation application of application Ser. No. 15/656,269, filed Jul. 21, 2017, now allowed, which is incorporated herein by reference in its entirety.

TECHNICAL FIELD

This disclosure relates generally to page segmentation. More specifically, but not by way of limitation, this disclosure relates to semantic page segmentation of vector graphics documents (e.g., document files in Adobe® Portable Document Format, or PDF) or other electronic documents via machine learning techniques that derive the page segmentation from both the visual appearance of the document and the text of the document.

BACKGROUND

Semantic page segmentation is the process of identifying individual regions in an electronic document in order to identify a role of a region (e.g., tables, captions, figures, etc.). Software applications exist for performing page segmentation operations on structured documents, such as word processing documents. Structural information included within such document files typically identifies the positions and types of the various objects of the document.

Vector graphics documents, such as Adobe® PDF documents, are widely used due to their compatibility with many different software applications, operating systems, and computing devices. But these vector graphics documents typically only include information about the paths, text, fonts and other encodings to be rendered on the page, while lacking structural information used by page segmentation algorithms to identify the different page objects within a page of the document. In one example, certain PDF files of scanned documents, older versions of PDF files generated from text documents, or pictures of documents converted to PDF files fail to include any structural information.

Existing solutions for performing page segmentation on electronic documents, such as unstructured vector graphics documents, typically use complex, heuristic rules to automatically identify and tag various structural objects within the document. But these existing solutions present disadvantages. For instance, some existing solutions use region-based classifications involving heuristic algorithms. Heuristic algorithms are not self-correcting or self-adjusting, because heuristics cannot learn. Therefore, heuristics require manual correction or addition of corner cases for which the algorithm does not properly function. For example, a heuristic might identify a table simply because the text contains the word "table" and a number. But this rule requires manual correction, for example for other text that contains the word table and a number but is not contained within a table. Additionally, manual intervention to add or correct a special case to a heuristic might not be possible if a software solution has been deployed to the end user. Further, existing solutions might not take advantage of both the text and the visual appearance of the layout, derived from the rendered page image.

Furthermore, certain existing solutions cannot distinguish between objects in unstructured documents with complex layouts. For example, these solutions use region-based classification algorithms that are only able to distinguish between high-level objects, such as a figure and a text block. These solutions are unsuitable for identifying low-level features such as section headers, figures, paragraphs, captions, and the like.

Accordingly, existing solutions fail to efficiently and effectively segment or other electronic documents for reasons such as (but not limited to) those described above.

SUMMARY

Systems and methods are disclosed herein for using one or more computing devices for categorizing text regions of an electronic document into document object types based on a combination of semantic information and appearance information from the electronic document. For example, a page segmentation application executing on a computing device accesses textual feature representations and visual feature representations. A textual feature representation represents a text portion of a document in a vector space. In some embodiments, each pixel in the set of pixels is mapped to the textual feature representation based on the set of pixels depicting the text portion. The page segmentation application obtains a visual feature representation that represents an appearance of a portion of the page that includes the set of pixels. The page segmentation application matches the visual feature representation to the textual feature representation from the text mapping based on both the visual feature representation and the textual feature representation corresponding to the set of pixels.

The page segmentation generates an output page segmentation of the electronic document by applying a neural network to the textual feature representation and the visual feature representation. In some embodiments, a first portion of the neural network is used to generate the visual feature representation, and a second portion of the neural network is used to generate the output page segmentation. Portions of the output page segmentation represent different document object types. The page segmentation application outputs a classification of the set of pixels as a particular document object type based on a correspondence between a location of the set of pixels in the electronic document and a location of the particular document object type in the output page segmentation.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE FIGURES

Features, embodiments, and advantages of the present disclosure are better understood when the following Detailed Description is read with reference to the accompanying drawings.

DETAILED DESCRIPTION

Figure 1:
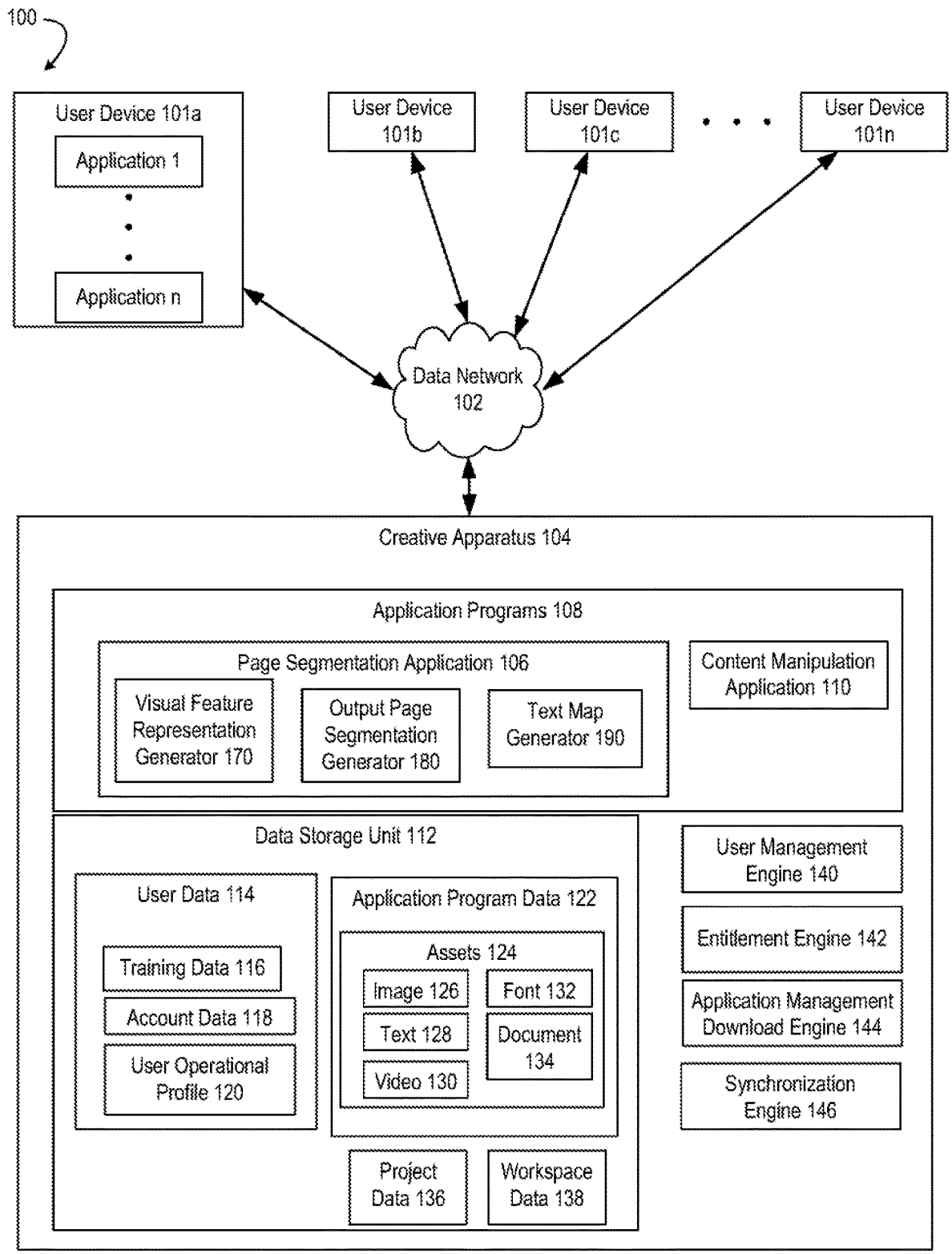
FIG. 1 depicts an example of a computing environment for computing a page segmentation, according to certain embodiments.

The present disclosure includes systems and methods for generating semantic page segmentation of unstructured vector graphics documents and other electronic documents. As discussed above, existing segmentation techniques present disadvantages that prevent them from identifying certain relevant segments of unstructured documents. Certain embodiments described herein can more effectively segment unstructured documents using a combination of appearance-based information derived from visual aspects of a document (e.g., drawing commands) and textual-based information from the text of the document (e.g., information describing the content of characters, words, phrases, or other text in the document regardless of the text's visual appearance).

The following non-limiting example is provided to introduce certain embodiments in which a page segmentation application generates information indicating the positions and types of different objects on a page within the document. The page segmentation application receives, as input, an electronic document, such as an unstructured PDF document. The page segmentation application uses both appearance-based information and text-based information to generate the page segmentation. Appearance-based information includes information about visual characteristics in an image of the page. Some examples of these visual characteristics include different text sizes, fonts, column-layouts, etc. Text-based information includes information about the text portions themselves (e.g., words and sentences) derived from the text contained within the document. For instance, the text-based information indicates that certain characters, words, phases, or sentences are present in the document, without regard to visual characteristics such as font, text size, etc. The page segmentation application outputs a page segmentation that includes, on a pixel-by-pixel basis, visual indicators identifying where different objects are located in the document (e.g., that a certain group of pixels corresponds to a certain object) and the object types of these objects.

In this example, the page segmentation application uses a trained neural network to create visual feature representations, such as feature vectors, that form the appearance of the electronic document. The trained neural network identifies certain features within the page, such as a first set of pixels that has the appearance of a table and a second set of pixels that has the appearance of a list. The neural network generates visual feature representations of the identified features, such as a first feature vector corresponding to the first pixels with the "table" appearance and a second feature vector corresponding to the second pixels with the "list" appearance.

Continuing with the example, the page segmentation application also uses the text from the electronic document to provide additional context and therefore improve the page segmentation. Text contained within an electronic document might be obtained using, for example, optical character recognition ("OCR") techniques. The page segmentation application transforms the obtained text into textual feature representations. Each textual feature representation represents, in a vector space, a text portion of the page of the document. The page segmentation application creates a text mapping that associates various pixels in the document with corresponding textual feature representations. Continuing with the example above, certain text in the document is located in a first region where a table is located, and other text in the document is located in a second region where a list is located. The page segmentation application identifies the text from the first region (i.e., the region where the table is located) and generates one or more textual feature representations representing that text. Thus, in the text mapping, if a certain pixel is included in a first set of pixels in the first region depicting the "table" text, then that pixel is mapped to one or more textual feature representations representing the "table" text. Similarly, the page segmentation application identifies the text from the second region, where the list is located, and generates one or more textual feature representations representing that text. In the text mapping, if a certain pixel is included in a second set of pixels depicting the "list" text, then that pixel is mapped to one or more textual feature representations representing the "list" text. Thus, the text mapping includes a mapping of each pixel in the set of pixels to the textual feature representation based on the set of pixels depicting the text portion.

Continuing with this example, the page segmentation application uses a combination of the visual feature representations and the textual feature representations to segment a certain set of pixels in a page segmentation. For instance, a given set of pixels corresponds to one or more visual feature representations. The page segmentation application determines, via the text mapping, that the same set of pixels corresponds to one or more textual feature representations. Thus, the page segmentation application determines that this set of pixels corresponds to the identified visual feature representations and textual feature representations. A neural network (or portion of a neural network), which is trained to segment a page based on both visual and textual information, receives the identified visual feature representations and textual feature representations as an input and uses these representations to generate at least part of a page segmentation. In particular, because the given set of pixels (e.g., pixels in the document region depicting a table) corresponds to the identified visual feature representations and textual feature representations, the neural network classifies these pixels as a certain object type (e.g., assigning a "table" object type). The page segmentation application generates, in the page segmentation, a visual indicator for this set of pixels that identifies the object type (e.g., a mask over the document region depicting a table having a certain color associated with the "table" type).

Thus, the page segmentation application creates an output page segmentation that can include a pixel-level classification (i.e., the assigned object types) and a segmentation mask (e.g., the visual indicators corresponding to the assigned object types). The pixel-level classification identifies object types corresponding to various pixel locations in the document. The segmentation mask illustrates the locations and types of page objects in the document.

Integrating the textual feature information helps to identify objects within a page that cannot be effectively identified otherwise. For example, textual information can identify the semantic meaning of a word or sentence depicted in a certain document region (e.g., that the word "allowable" or the phrase "allowable claims" are depicted by a set of pixels), but the semantic meaning for certain pixels (i.e., the identification of the depicted word or sentence) alone might not be sufficient to classify the pixels since a certain word or sentence can belong to different object types (e.g., table, caption, etc.). Similarly, visual information (e.g., dashes, large text, etc.) might broadly indicate a desired classification for a document region, but this visual information alone might be insufficient for accurately classifying the pixels in the document region. However, using a combination of textual and visual information allows the page segmentation application to assign a certain classification (i.e., object type) to a certain set of pixels that is consistent with both the actual meaning of the text depicted by the pixels (e.g., that the pixels depict the phrase "allowable claims") and the visual appearance of the pixels (e.g., that the bold text and center alignment of the "allowable claims" indicates a section heading).

As noted above, embodiments described herein use neural networks to perform the page segmentation. For instance, a neural network has a first portion (e.g., a set of encoders and decoders) that are trained to generate visual feature representations from various sets of pixels in various regions of a page. The neural network has a second portion (e.g., one or more additional decoders) that are trained to classify, from a combined set of visual and textual feature representations, certain pixels as belonging to certain object types. In some embodiments, one or more portions of the neural network are trained in a supervised manner. For example, training data, or in some embodiments, training data in the form of an electronic document with accompanying correct classifications is provided to the neural network for classification and segmentation. After the page segmentation application receives the training data and generates corresponding classifications and segmentations, any discrepancies between the identified object types (as indicated in a generated page segmentation) and the correct object types (as indicated in the "correct" classifications provided to the neural network) are fed back into the page segmentation application so that the page segmentation application can be adjusted. The page segmentation application also can improve, for example, by receiving an indication to adjust internal parameters based on obtaining a less-than-ideal result.

Embodiments described herein for segmenting an electronic document can facilitate editing the electronic document by, for example, intelligently reflowing document pages on different display screens, or making the document accessible to the visually impaired, etc. For instance, using structural information, each paragraph on a page is identified and one paragraph at a time is displayed on a small mobile phone screen. If the positions of objects such as text blocks, tables, and captions are known, the contents of the objects is analyzed for further structural information. This structural information allows users to sort tables based on different columns or to query the data contained in the tables.

As further noted above, some embodiments described herein are used to segment unstructured vector graphics document. As used herein, "unstructured vector graphics document" refers to a vector graphics document file that does not include structural data identifying individual objects occurring on any of the document's pages. For example, older PDF files, scanned PDF files, and pictures of documents converted to PDF files might not include any structural information. Additionally, while some vector graphics document files might have some limited structural information, those files might not have sufficient structural information or might define objects in an undesirable manner for purposes of performing page segmentation. Thus the term "unstructured vector graphics" is used broadly herein to encompass even vector graphics documents with such limited structural information.

As used herein, the term "object" or "page object" is used to refer to a separately identifiable area of a page identifying a type of page object, such as a text box, caption, or table.

As used herein, the term "instance" is used to refer to one particular occurrence of one object type. For example, a document might contain two instances of a text box, and one instance of a figure.

Example of an Operating Environment for Computing a Page Segmentation

Referring now to the drawings, FIG. 1 depicts an example of a computing environment for computing a page segmentation, according to certain embodiments. In the example depicted in FIG. 1, various user devices 101a-n access a creative apparatus 104 via a data network 102. The creative apparatus 104 executes one or more page segmentation applications 106 (or other suitable program code) for performing one or more functions used in generating a page segmentation model.

In some embodiments, the page segmentation application 106 includes one or more visual feature representation generators 170, one or more output page segmentation generators 180, and one or more text map generators 190. The visual feature representation generator 170 receives the image of the electronic document and generates visual feature representations for various document regions. The text mapping generator 190 obtains or otherwise receives the text of the document (e.g., by implementing an OCR operation), creates textual feature representations from the text, and creates a text mapping. The text mapping associates the textual feature representations to the pixels depicting the text from which the textual feature representations are generated. In one example, the text mapping associates a set of pixels that depicts the phrase "allowable claims" to a textual feature representation that represents the phrase "allowable claims." For a given set of pixels (e.g., the pixels depicting the phrase "allowable claims"), the output page segmentation generator 180 matches the visual feature representation, which could indicate that the set of pixels depicts bold-faced and center-aligned text, to the textual feature representation, which could indicate that the set of pixels depicts the phrase "allowable text," via the text mapping. This match allows the page segmentation application to identify a combined set of visual and textual feature representations for that set of pixels to create an output page segmentation.

The page segmentation application 106 is implemented using neural networks. For example, a neural network generates the visual feature representations, receives the text mapping, and creates the output page segmentation from a combination of the visual feature representations and corresponding textual feature representations identified from the text mapping. Training data 116 is used to train the neural networks within the page segmentation application 106 to perform these tasks (e.g., generating visual feature representations and assigning an object type or other class to a set of pixels having certain visual and textual feature representations).

In some embodiments, the page segmentation application 106 is a separate application that generates a page segmentation from an electronic document and provides the page segmentation to one or more applications or services that are available via the creative apparatus 104 (e.g., a content manipulation application 110). In other embodiments, the page segmentation application 106 is included in one or more applications or services that are available via the creative apparatus 104 (e.g., a content manipulation application 110).

Some embodiments of the network environment 100 include user devices 101a-n. Examples of a user device include, but are not limited to, a personal computer, tablet computer, a desktop computer, a processing unit, any combination of these devices, or any other suitable device having one or more processors. Each user device includes at least one application supported by the creative apparatus 104. User devices 101a-n correspond to various users. Examples of the users include, but are not limited to, creative professionals or hobbyists who use creative tools to generate, edit, track, or manage creative content, marketing professionals who use marketing tools to generate, edit, track, or manage online content, or to manage online marking processes, end users, administrators, users who use image tools to create, edit, track, or manage images, advertisers, publishers, developers, content owners, content managers, content creators, content viewers, content consumers, designers, editors, any combination of these users, or any other user who uses digital tools to create, edit, track, or manage digital experiences.

Digital tools, as described herein, include tools such as the content manipulation application 110 that are used to perform a function or a workflow electronically. Examples of a digital tool include, but are not limited to, a creation tool, content editing tool, content publishing tool, content tracking tool, content managing tool, content printing tool, content consumption tool, any combination of these tools, or any other tool that is used for creating, editing, managing, generating, tracking, consuming or performing any other function or workflow related to content. Digital experience, as described herein, includes experience that is consumed through an electronic device. Examples of the digital experience include content creating, content editing, content tracking, content publishing, content posting, content printing, content managing, content viewing, content consuming, any combination of these experiences, or any other workflow or function that is performed related to content. Content, as described herein, includes electronic content. Examples of content include, but are not limited to, image, video, website, webpage, user interface, menu item, tool menu, magazine, slideshow, animation, social post, comment, blog, data feed, audio, advertisement, vector graphic, bitmap, document, any combination of one or more content, or any other electronic content.

Each of the user devices 101a-n is communicatively coupled to the creative apparatus 104 via the data network 102. A user of a user device can use various products, applications, or services supported by the creative apparatus 104 via the data network 102. Examples of the data network 102 include, but are not limited to, Internet, local area network ("LAN"), wireless area network, wired area network, wide area network, and the like.

The creative apparatus 104 includes one or more engines for providing one or more digital experiences to the user. In some embodiments, these engines include one or more of the engines depicted in FIG. 1. In other embodiments, one or more of the engines depicted in FIG. 1 might be omitted from a creative apparatus 104.

The creative apparatus 104 is implemented using one or more servers, one or more processing devices, one or more platforms with corresponding application programming interfaces, cloud infrastructure, or the like. In addition, each engine can also be implemented using one or more servers, one or more processing devices, one or more platforms with corresponding application programming interfaces, cloud infrastructure, or the like. The creative apparatus 104 also includes a data storage unit 112. The data storage unit 112 is implemented as one or more databases or one or more data servers. The data storage unit 112 includes data that is used by the page segmentation application 106 and other engines of the creative apparatus 104.

The user can use one or more application programs 108, including the content manipulation application 110, to create one or more projects or assets. In addition, the user also has a workspace within each application program. The workspace, as described herein, includes setting of the application program, setting of tools or setting of user interface provided by the application program, and any other setting or properties specific to the application program. Each user has a workspace. The workspace, the projects or the assets are stored as application program data 122 in the data storage unit 112 by a synchronization engine 146. The application program data 122 is specific to the user or is shared with other users based on rights management.

In some embodiments, the application program data 122 includes one or more assets 124. The assets 124 might include shared assets that the user wants to share with other users or that the user wants to offer in a marketplace. The assets 124 can also be shared across multiple application programs 108. In some embodiments, each asset includes metadata.

In some embodiments, each asset also includes a file. Examples of the file include, but are not limited to, an image 126, text 128, a video 130, a font 132, a document 134, a combination of any of these, and the like. In another embodiment, an asset only includes the metadata. The application program data 122 also includes project data 136 and workspace data 138. In some embodiments, the project data 136 includes copies of the assets 124 or the assets 124 themselves. In additional or alternative embodiments, the assets 124 are standalone assets. Similarly, the workspace data 138 is part of the project data 136 in some embodiments and might be standalone data in other embodiments.

In some embodiments, the user can have one or more user devices (e.g., user devices 101a-n). The application program data 122 is accessible by the user from any device (e.g., user device 101b), including a device that was not used to create the assets 124 (e.g., user device 101c). This is achieved by the synchronization engine 146 that stores the application program data 122 in the data storage unit 112 and makes the application program data 122 available for access by the user or other users via any device. Before accessing the application program data 122 by the user from any other device or by any other user, the user or the other user might need to provide login details for authentication if not already logged in. Otherwise, if the user or the other user is logged in then a newly created asset or updates to the application program data 122 are provided in real time. The workspace data 138 enables the synchronization engine 146 to provide same workspace configuration to the user on any other device or to the other user based on rights management data.

In some embodiments, a user of one or more of the user devices 101a-n visits a webpage or an application store to explore applications supported by the creative apparatus 104 (e.g., the content manipulation application 110). The creative apparatus 104 provides the applications (e.g., the content manipulation application 110) as a software as a service ("SaaS"), or as a standalone application that is installed on the user device 101, or as a combination.

In some embodiments, the user creates an account with the creative apparatus 104 by providing user details and by creating login details. Alternatively, the creative apparatus 104 can automatically create login details for the user in response to receipt of the user details. In some embodiments, the user is also prompted to install an application manager. The application manager enables the user to manage installation of various applications supported by the creative apparatus 104 and to manage other functionalities, such as updates, subscription account and the like, associated with the applications. The user details are received by a user management engine 140 and stored as user data 114 in the data storage unit 112. In some embodiments, the user data 114 further includes account data 118 under which the user details are stored.

In some embodiments, the user either can opt for a trial account or can make payment based on the type of account or subscription chosen by the user. Alternatively, the payment is based on the product or number of products chosen by the user. In some embodiments, based on payment details of the user, a user operational profile 120 is generated by an entitlement engine 142. The user operational profile 120 is stored in the data storage unit 112 and indicates entitlement of the user to various products or services. In some embodiments, the user operational profile 120 also indicates type of user, i.e., free, trial, student, discounted, or paid. In some embodiments, the user management engine 140 and the entitlement engine 142 is one single engine performing the functionalities of both the engines.

In some embodiments, the user installs various applications supported by the creative apparatus 104 via an application download management engine 144. Application installers or application programs 108 (which might include the content manipulation application 110 or other software usable to perform operations described herein) are present in the data storage unit 112 and are fetched by the application download management engine 144. These applications are made available to the user directly or via the application manager. In some embodiments, all application programs 108 are fetched and provided to the user via an interface of the application download management engine 144. In other embodiments, application programs 108 for which the user is eligible based on the user's operational profile are displayed to the user. The user selects the application programs 108 that the user wants to download. The application programs 108 are downloaded on one or more of the user devices 101a-n by the application manager via the application download management engine 144. Corresponding data regarding the download is also updated in the user operational profile 120. An application program 108 is an example of a digital tool. The application download management engine 144 also manages a process of providing updates to the user device 101.

In some embodiments, upon download, installation, and launching of an application program, the user is asked to provide the login details. A check is again made by the user management engine 140 and the entitlement engine 142 to ensure that the user is entitled to use the application program. In other embodiments, direct access is provided to the application program as the user is already logged into the application manager.

Examples of Operations for Generating a Page Segmentation

Figure 2:
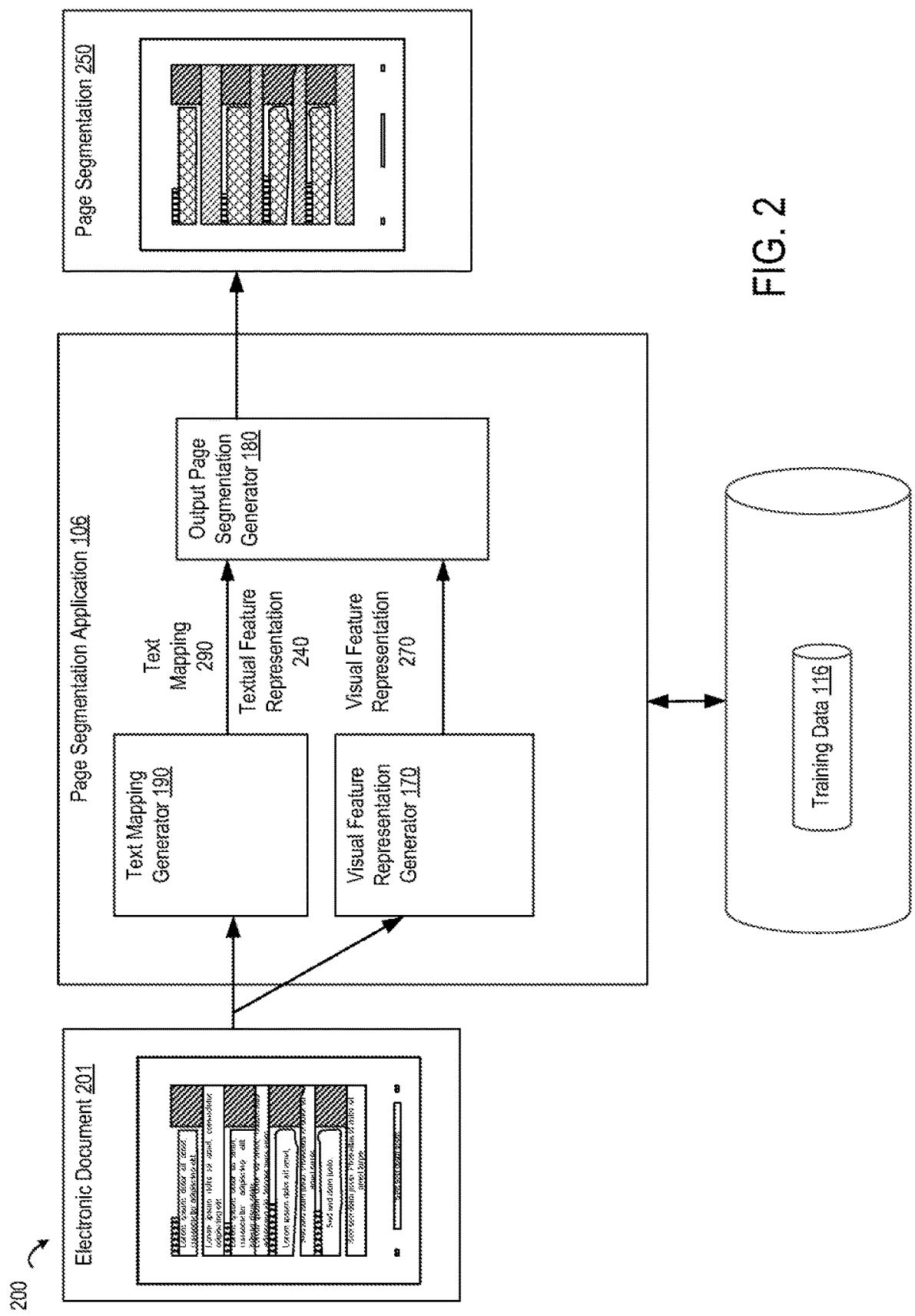
FIG. 2 depicts an example of a communication flow for computing a page segmentation, according to certain embodiments.

As described in detail with respect to the various examples below, the page segmentation application 106 is used to develop a page segmentation according to various embodiments. FIG. 2 depicts an example of a communication flow 200 for computing a page segmentation, according to certain embodiments. In this example, the page segmentation application 106 receives an electronic document 201. The text mapping generator 190 generates a textual feature representation that includes the features of the text within the electronic document 201, such as the meaning of words and sentences. The text mapping generator 190 generates a text mapping 290, which includes the mapping of each pixel to the text depicted (in part) by that pixel.

The visual feature representation generator 170 generates a visual feature representation 270 that contains a representation of the visual features within the electronic document 201 represented by each pixel. For example, the visual feature representation 270 might include, for example, a representation of an edge, a corner, a shape, or a change in contrast, in the image, which might indicate the side of a figure, or the border of a table in the electronic document 201.

Page segmentations based on visual features alone might lack details that are available from textual information. For example, text in large font might be mislabeled as a section heading. Text with dashes might be mislabeled as a list. Similarly, a page segmentation based only on textual information might be inferior to those using both visual and textual information. For example, a name within a document could be a title, an author or a figure caption. Accordingly, a robust page segmentation system uses both the visual information of the document and the textual information of the text to disambiguate possible false identifications.

The page segmentation application 106 might use a neural network to perform the page segmentation. As discussed further herein, an example of the neural network is a convolutional neural network with a block of encoders and a block of decoders. The visual feature representation generator 170 uses part of a neural network (e.g., a set of encoders and decoders) to generate the visual feature representation 270. The text mapping generator 190 can use part of a neural network to generate the textual feature representation 240 and the text mapping 290. The output page segmentation generator 180 uses the text mapping 290 to match a given visual feature representation 270 to a corresponding textual feature representation 240. Another part of a neural network (e.g., one or more decoders), which can be used to implement the output page segmentation generator 180, receives the visual feature representation 270 and the corresponding textual feature representation 240 as inputs. (As described in greater detail with respect to FIG. 5, a bridge connection connects the output of the text mapping generator 190 to an input at this part of the neural network.) This part of the neural network outputs the page segmentation 250, which classifies a given set of pixels based on the visual feature representation 270 and corresponding textual feature representation 240 for the set of pixels.

A textual feature representation 240, which is generated by the text mapping generator 190, identifies the features of the text within the electronic document 201, such as the meaning of words and sentences. From the textual feature representation 240, the page segmentation application 106 causes the text mapping generator 190 to generate a text mapping 290 from the electronic document 201. The text mapping 290 maps each pixel in a given set of pixels to the textual feature representation 240, the text portion depicted by the set of pixels that includes the pixels.

The text mapping 290 includes information that helps improve the page segmentation 250 over purely appearance-based methods. Textual information, for example, can help the page segmentation application 106 to determine whether a particular piece of text is an object such as a caption or a paragraph. Textual information can guide the page segmentation application 106, specifically the output page segmentation generator 180, to form a better page segmentation 250 than would be generated by a segmentation algorithm that relied solely on visual information. For example, using a combination of the textual feature representation 240 with the visual feature representation 270 informs the output page segmentation generator 180 that the text in large font might look like a section heading object, but is actually part of a caption.

The neural networks used in the page segmentation application 106 are trained to generate feature representations from electronic documents and to classify portions of the electronic document as certain object types. Training data 116 is provided to the page segmentation application 106 (or a separate training module), thereby allowing the neural networks to learn these features and classifications. For example, the visual feature representation generator 170 uses training data 116 to better generate the visual feature representation 270. Similarly, the output page segmentation generator 180 uses training data 116 to better generate the page segmentation 250.

Figure 3:
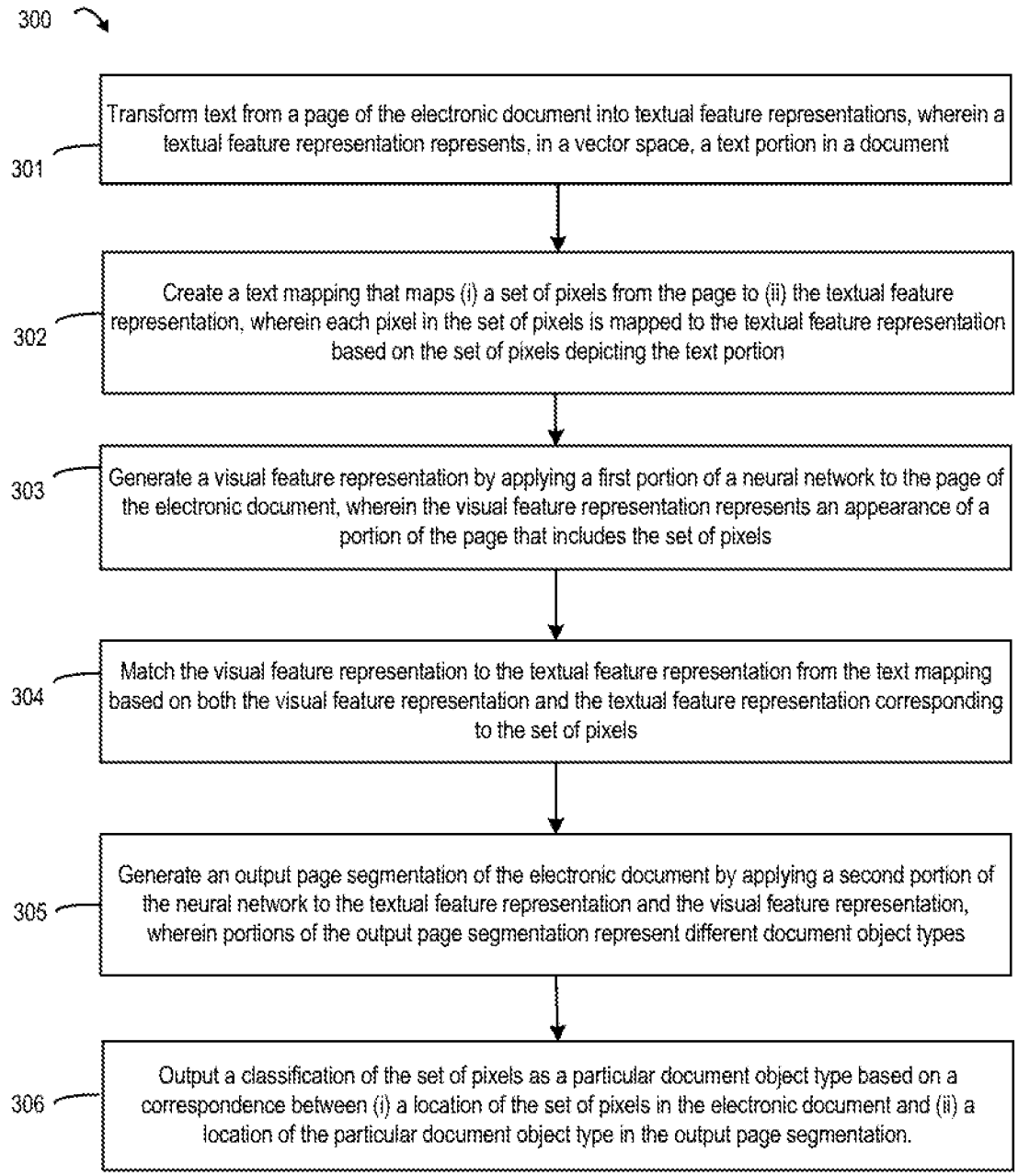
FIG. 3 depicts an example of a method for computing a page segmentation, according to certain embodiments.

FIG. 3 depicts an example of a method for computing a page segmentation described above with respect to FIG. 2. In some embodiments, one or more processing devices implement operations depicted in FIG. 3 by executing suitable program code (e.g., the page segmentation application 106). For illustrative purposes, the method 300 is described with reference to various examples depicted herein, such as the examples depicted in FIGS. 1, 2, and 4-6. Other implementations, however, are possible.

The page segmentation application 106 uses both visual and textual contents of the electronic document to create the page segmentation. At block 301, the method 300 involves transforming text from a page of the electronic document into textual feature representations. A textual feature representation represents, in a vector space, a text portion in a document. The generated textual feature representation 240 might include vectors of any suitable dimension. The textual feature representation 240 represents a text portion of the electronic document. Text portions can be represented at any suitable level of granularity (e.g., by sentence, by phrase, by word, by character, etc.). For example, if the document includes a visual depiction of the sentence "this application is allowable," a textual feature representation 240 could be generated that represents the entire sentence and indicates that the sentence is included in the document. Additionally or alternatively, multiple textual feature representations 240 could be generated for respective words in the sentence (e.g., a first textual feature representation 240 indicating that the word "this" is included in the document, a second textual feature representation 240 that the word "application" is included in the document, etc.). The textual feature representation 240 is included in a text mapping 290, which associates a given pixel (or group of pixels) included in a depiction of certain text with the textual feature representation 240 corresponding to that text.

Figure 4:
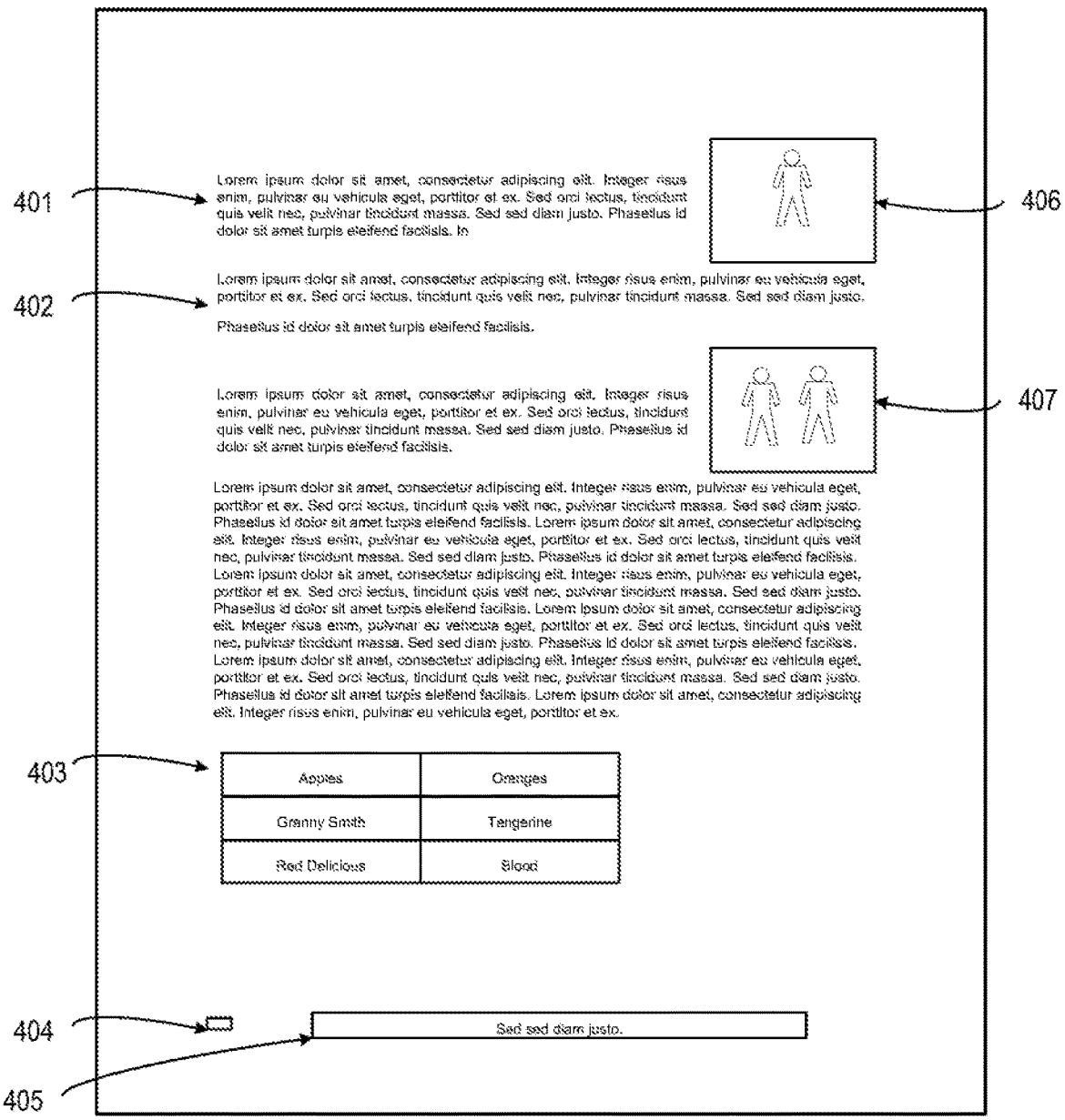
FIG. 4 depicts an example of an input vector graphics document, according to certain embodiments.

An example of an input electronic document is shown in FIG. 4. The document 400, which can be a vector graphics document, is an example of an electronic document 201 that is segmented by the page segmentation application 106. The document 400 includes text portions having a text object 401, a text object 402, and a text object 405. In some embodiments, prior to performing the page segmentation described herein, no information is available that identifies the object types for the text objects 401-403. The document 400 further includes a table 403, an image 406, and an image 407, among other objects. The document also includes a page number 404.

Returning to FIG. 3, the page segmentation application 106 provides the text of the electronic document 201 to the text map generator 190. The text map generator 190 generates one or more textual feature representations 240 from the text of the electronic document 201. Different embodiments might build textual feature representations 240 based on different sized text portions. Many different approaches to creating a textual feature representation 240 are possible.

In one example, the text mapping generator 190 uses a sentence as a basic unit and therefore generates a textual feature representation of a particular sentence for every pixel within a region of the document corresponding to the sentence (e.g., a document region where the sentence is positioned). In another example, the text mapping generator 190 uses a paragraph as a basic unit of analysis and generates textual feature representation representations for respective paragraphs in the document, where a first pixel in a first document region having a first paragraph corresponds to a first textual feature representation for that first paragraph and a second pixel in a second document region having a second paragraph corresponds to a second textual feature representation for that second paragraph. Similarly, the text mapping generator 190 might be configured to perform analysis on a character-by-character basis, or sentence-by-sentence basis.

In some embodiments that involve using groups of words (e.g., phrases, sentences, paragraphs, etc.) as units for textual feature representations, the text mapping generator 190 builds the textual feature representation 240 for a particular word group (e.g., phrase, sentence, paragraph) by averaging a text representation for individual words in the word group. For example, the text mapping generator 190 generates a vector representing the sentence "this claim is allowable" by averaging four vectors respectively representing the words "this," "claim," "is" and "allowable." If pixels in a document do not belong to any sentences or other text portions, those pixels are associated with zero vectors (i.e., vectors indicating that no text is present in a certain document portion).

In some embodiments, pixels that represent words in the same sentence could be associated with the representation of the sentence. For example, if a sentence is "I am Sam," then all pixels that represent all words and letters in the words, e.g., "I," "a," "m," "S," "a," and "m" can all represent the sentence "I am Sam." Alternatively, pixels that represent words in the same sentence could instead be associated with individual words that the sentences represent. In other embodiments, pixels that represent different letters in the same word can be associated with the word. Alternatively, pixels that represent different letters in the same word can be associated with the different letters.

The size of a text mapping with various textual feature representations 240 depends on the number of pixels in the electronic document 201 and the depth of the generated vectors (i.e., textual feature representations 240). For example, for a document image of size H×W pixels in which one or more pixels are mapped to N-dimensional vectors (i.e., textual feature representations), the text mapping generator 190 generates a textual mapping of size H×W×N.

The text mapping generator 190 might use different models to create the textual feature representation 240 for the words within a sentence. In some embodiments, the text mapping generator 190 uses a skip-gram model to learn the textual feature representation 240. The skip-gram model determines a vector for each word and uses a prediction model to predict the next word in the sentence to create the vector representation. If V is the number of words in a vocabulary, and w is a V-dimensional, one-hot vector representing a word, the training objective is to find a N-dimensional (N<<V) vector representation for each word that is useful for predicting the neighboring words.

For example, given a sequence of words $w_1; w_2; \ldots$, the average log probability is maximized by maximizing the function $$\frac{1}{T}\sum_{t=1}^{T}\sum_{-C \leq j \leq C, j \neq 0} \log P_{(w_{t+j}|w_t)},$$

in which T is the length of the sequence, and C is the size of the context window. The probability of outputting a word $w_O$ given an input word $w_i$ is defined using a softmax function $$P(w_o \mid w_i) = \frac{\exp(v'_{w_o}{}^\top v_{w_i})}{\sum_{w=1}^{V} \exp(v'_w{}^\top v_{w_i})},$$

in which $V_w$ and $V_{w'}$ are the input and output N-dimensional vector representations of a given word w. The text mapping generator 190 uses the textual feature representation 240 to generate the text mapping 290.

At block 302, the method 300 involves creating a text mapping that maps a set of pixels to the textual feature representation. Each pixel in the set of pixels is mapped to the textual feature representation based on, for example, the set of pixels depicting the text portion. The text mapping generator 190 generates the text mapping 290 using the textual feature representations 240 generated at block 301.

To generate the text mapping 290, the text mapping generator 190 associates the textual feature representation 240 with the pixels on the page of the electronic document 201. For example, for each pixel on the page, the text mapping generator 190 maps the pixel to a particular textual feature representation 240 corresponding to the pixel's location on the page. The text mapping generator 190 then provides the text mapping 290 to the output page segmentation generator 180.

At block 303, the method 300 involves generating a visual feature representation by applying a first portion of a neural network to the page of the electronic document. The visual feature representation represents an appearance of a portion of the page that includes the set of pixels. For example, the visual feature representation generator 170 generates one or more visual feature representations 270.

The visual feature representation 270 includes an identification of the features within an image necessary for the identification of the visual objects within the document. For example, an image of a document might depict text from the document that is arranged in a certain manner, such as text boxes, captions, etc. The visual feature representation 270 includes the features detected within the image of the electronic document 201. The features help the output page segmentation generator 180 to categorize the objects within the electronic document 201.

Figure 5:
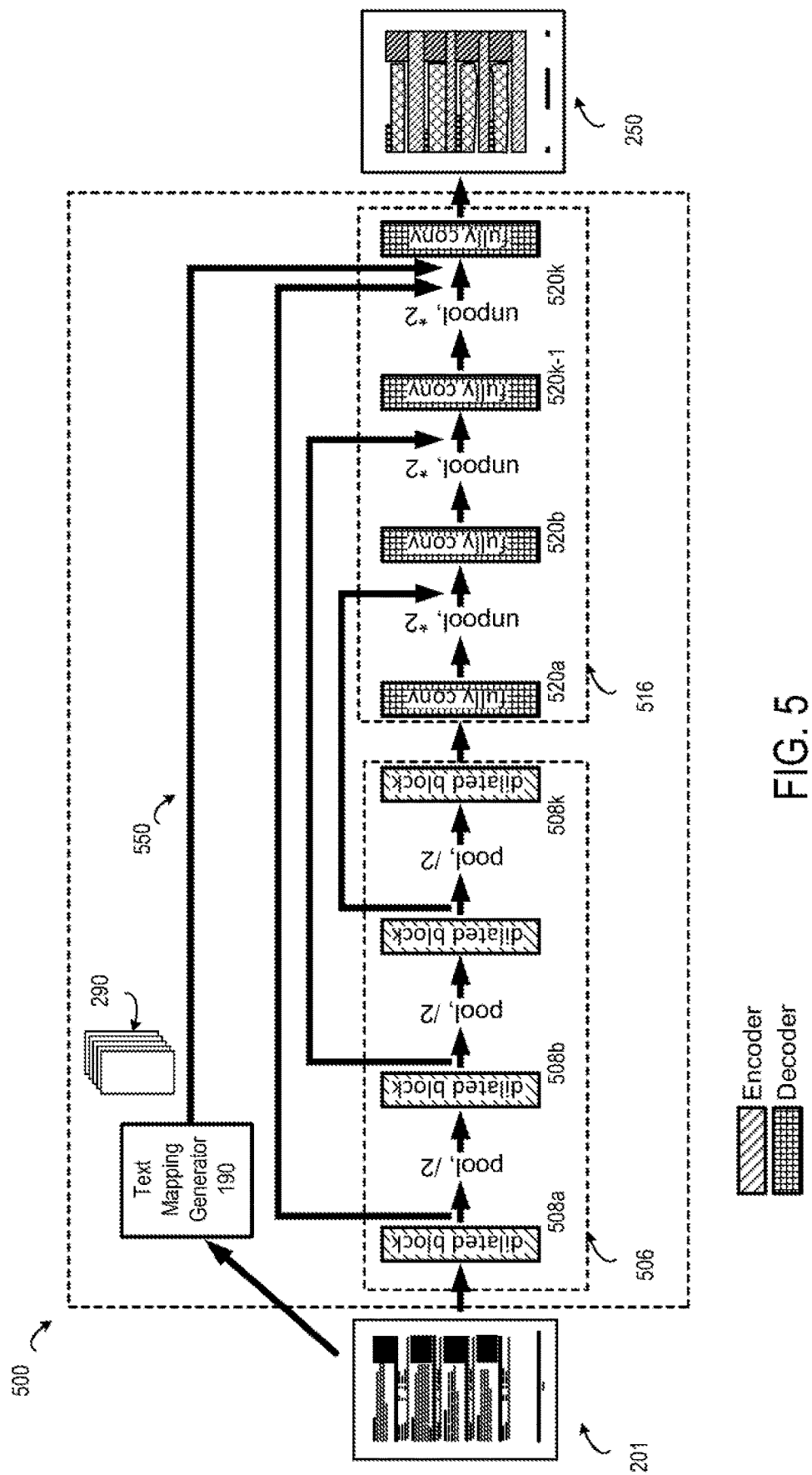
FIG. 5 depicts an example of a neural network for computing a page segmentation for the input vector graphics document depicted in FIG. 4, according to certain embodiments.

In some embodiments, a neural network, such as a convolutional neural network, is used to implement one or more blocks of the method 300. For example, FIG. 5 depicts an example of a neural network 500 that computes a page segmentation, according to certain embodiments. The trained neural network 500 performs one or more actions such as, for example, creating the visual feature representation 270, matching the visual feature representation 270 with the text map 290, or generating the page segmentation 250. A convolutional neural network includes one or more encoders 506 and one or more decoders 516.

In some embodiments, a first portion of the neural network, such as the encoders 506 and at least some of the decoders 516, performs the functions of the visual feature representation generator 170. The encoder 506 performs one or more feature-extraction operations that generate visual feature representations 270 from an input image.

In the example depicted in FIG. 5, the encoder 506 includes multiple encoder blocks 508*a-k*. The decoder 516 includes multiple decoder blocks 520*a-k*. The encoder blocks 508*a-k* and the decoder blocks 516*a-k* can be connected in different ways. For example, in the neural network 500, the encoder blocks 508*a-k* and the decoder blocks 516*a-k* are connected in an alternative skip configuration. In the alternative skip configuration, the first encoder block 508*a* in the encoder 506 is connected to the last decoder block 520*k* in the decoder 516. Similarly, the second encoder 508*b* is connected to the second-to-last decoder 520*k*-1.

In some embodiments, the encoder blocks 508*a-k* are implemented as dilated encoder blocks. Dilated encoder blocks are non-contiguous convolutional filters. The amount of dilation is configured such that small fields on the electronic document 201 are still captured by the page segmentation application 106. For example, the receptive fields of the dilated encoder blocks might include five dilated convolutions with a 3×3 kernel size and a dilation of d=1, 2, 4, 8, 16. Such a configuration enables the page segmentation application 106 to capture a bulleted list, for example, because the receptive fields are large enough to capture bullets of a bulleted list.

Returning to FIG. 3, at block 304, the method 300 involves matching the visual feature representation to the textual feature representation from the text mapping based on both the visual feature representation and the textual feature representation corresponding to the set of pixels. More specifically, the page segmentation application 106 matches the visual features for a pixel (or set of pixels), as represented in the visual feature representation 270, with the textual feature representation 240 associated with the pixel (or set of pixels) in the text mapping 290. Thus, this matching operation allows the page segmentation application 106 to use a combination of the visual feature representation 270 and the textual feature representation 240 to classify a particular pixel (or set of pixels) associated with these feature representations.

Block 304 can be performed by a portion of a neural network. In the example depicted in FIG. 5, a first portion of the neural network 500 includes encoder blocks 508*a* through 508*k* and decoder blocks 520*a* through 520*k*. These encoder and decoder blocks are trained to output the visual feature representation.

Returning to FIG. 3, at block 305, the method 300 involves generating an output page segmentation of the electronic document by applying a second portion of the neural network to the textual feature representation and the visual feature representation, wherein portions of the output page segmentation represent different document object types. For example, the output page segmentation generator 180 might decide whether a given pixel should be associated with another pixel based on the textual meaning of the text at each pixel. The output page segmentation generator 180 uses the textual information to either validate or change the classification of the object type. Similarly, the output page segmentation generator 180 might decide, based on the text mapping 290, that a particular pixel does not belong in the same classification as another pixel.

In some embodiments, the output page segmentation generator 180 is implemented by a decoder of a neural network. Continuing with the example depicted in FIG. 5, a second portion of the neural network 500 (i.e., the decoder block 520k) receives, as an input, the visual feature representation outputted from the other decoder blocks. A bridge connection 550 provides the textual feature representation from a text map generator to the same decoder blocks 520k as another input. (Although decoder block 520k is used in the example of FIG. 5, the bridge connection 550 can be tailored to provide the textual feature representation 240 to different decoder blocks 520a-k, depending on implementation). The bridge connection 550 facilitates the combined use of the visual feature representation 270 and the textual feature representation 240. The features in the visual feature representation 270 and the textual feature representation 240 are used to classify certain document portions (e.g., certain sets of pixels depicting different objects) as being certain object types within the electronic document 201. Accordingly, the accuracy of the classification of the object type at a given pixel is improved because a classification that would otherwise be computed based on visual information alone is supplemented by textual information. These classifications are used to generate a page segmentation 250.

The decoder 516 can generate the page segmentation 250 by performing a variety of functions relating to page segmentation, including unpooling. Unpooling is used in reaction to pooling used in the encoder 506. Pooling is used by an encoder 506 to filter data that is unnecessary at the encoding stage. However, such information might help identify the location of objects, as required for page segmentation, and thus be needed by the decoder 516. Thus, the decoder 516 might use unpooling between the decoder blocks 520a-k to recreate some spatial information lost during pooling. The alternative skip connection in conjunction with unpooling preserves more of the spatial information lost during pooling.

Figure 6:
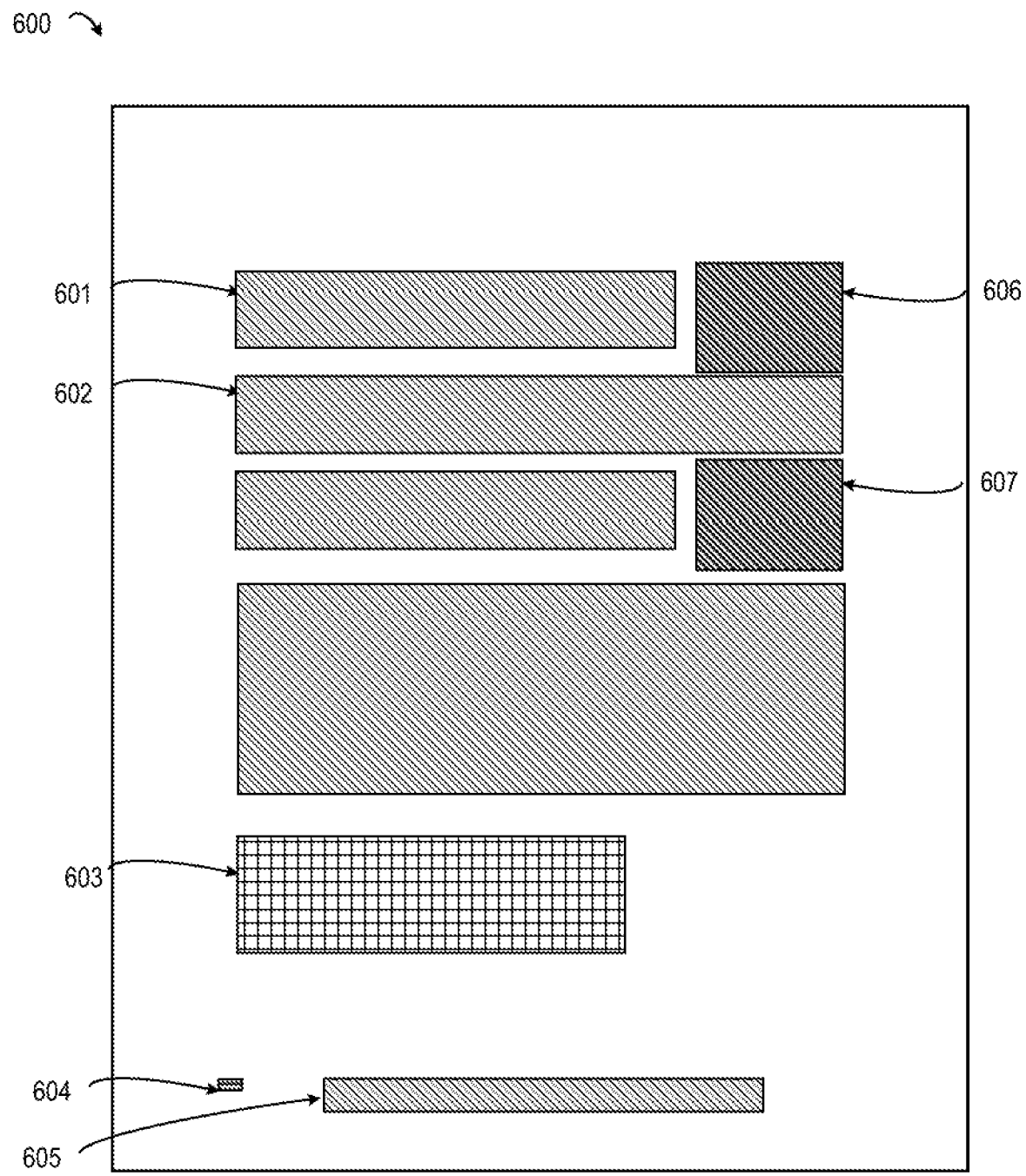
FIG. 6 depicts an example of an output page segmentation generated by the neural network of FIG. 5 and corresponding to the input vector graphics document of FIG. 4, according to certain embodiments.

An example of a page segmentation 600 is shown in FIG. 6. The page segmentation 600 includes text object 601, text object 602, and text object 605, generated by the page segmentation application 106 and corresponding to text object 401, text object 402, and text object 405 depicted in FIG. 4. Text object 601, text object 602, and text object 605 have been identified and classified as text objects by the page segmentation application 106. Similarly, table 603, corresponding to table 403, has been correctly classified as a table. FIGS. 606 and 607, corresponding to FIGS. 406 and 407 have been classified as figures. The page number 604, corresponding to the page number 404, has been correctly classified.

The page segmentation application 106 might also perform a post-processing algorithm. The post-processing algorithm helps to improve the results of the page segmentation application 106 by improving the classification. For example, the post-processing algorithm can adjust an initial, raw, page segmentation and transform the raw page segmentation into an improved output page segmentation. For example, the post-processing algorithm analyzes each pixel on the page and calculates a respective probability that the pixel is within each of a predefined number of object classes. The post-processing algorithm assigns, for each pixel, based on the respective probability, a most likely object type and incorporates the likely object type into the classification.

In one example, the post-processing algorithm identifies a first segmentation portion of the raw page segmentation that corresponds to the particular document object type, such as a table. The post-processing algorithm identifies a second segmentation portion of the raw page segmentation that corresponds to a different document object type, such as a heading. If the electronic document is a vector graphics document, the post-processing algorithm identifies the rendering commands used to generate different object in the document. For instance, a set of rendering commands could indicate that a portion of the document belongs to a common object. In the example provided above, the post-processing algorithm uses these rendering commands to identify a common bounding box that includes locations in the electronic document corresponding to the first segmentation portion and the second segmentation portion. For example, if the first segmentation portion and the second segmentation portion correspond to a common object, as indicated by rendering commands from the vector graphics document, then the post-processing algorithms applies the common bounding box to these segmentation portions. The post-processing algorithm determines that the first segmentation portion is larger than the second segmentation portion, which indicates a higher probability that an object type assigned to the first segmentation portion is correct and a lower probability that an object type assigned to the second segmentation portion is incorrect. Based on this determination, the post-processing algorithm modifies the raw page segmentation by causing both the first segmentation portion and the second segmentation portion to correspond to the particular document object type.

In another example, the post-processing algorithm determines that certain segmentation portions, which correspond to areas in the input document without text, should be classified as a "background" object type rather than some other object type (e.g., paragraph, caption, etc.). For instance, the post-processing algorithm identifies a segmentation portion of the raw page segmentation that has been assigned one or more object types indicating the presence of text (e.g., paragraph, caption, etc.). But if the document region corresponding to this segmentation portion is outside of a bounding box, then a higher likelihood exists that no text exists within the document region. If the post-processing algorithm determines that the segmentation portion corresponds to a location in the electronic document that is outside a bounding box (e.g., the common bounding box described in the example above), the post-processing algorithm modifies the raw page segmentation so that the segmentation portion is reclassified as a "background" object type. This reclassification changes the object type indicating the presence of text (e.g., paragraph, caption, etc.) from the raw page segmentation into the object type indicating a background (e.g., absence of text) in the output page segmentation.

Returning to FIG. 3, at block 306, the method 300 involves outputting a classification of the set of pixels as a particular document object type based on a correspondence between (i) a location of the set of pixels in the electronic document and (ii) a location of the particular document object type in the output page segmentation. For instance, the output page segmentation generator 180 generates, at block 305, a segmentation mask indicating where objects are located in the document and indicating types of objects represented by various pixels. A page segmentation application (or other application having access to the output page segmentation and its segmentation mask) might receive a request (e.g., a command via a user interface) to inform a user of how a document has been segmented. With respect to a particular set of pixels in the document, the application responds to this request by accessing the output page segmentation, locating a portion of the page segmentation corresponding to that set of pixels, identifying the classification applied to the corresponding portion of the page segmentation, and outputting the identified classification via a graphical interface.

Examples of Training a Neural Network for Page Segmentation

As discussed, implementations of the page segmentation application 106 use neural networks, such as the neural network 500 depicted in FIG. 5. For example, a neural network is trained to learn how to create the visual feature representation 270. In some embodiments, certain unsupervised training operations are used to improve the ability of the neural network 500 to recognize that certain document regions belong to the same object and should therefore have the same (or similar) visual representation.

In these embodiments, a training process includes minimizing a consistency loss function. The consistency loss function indicates whether certain document regions that belong to a common object have similar visual feature representations, which facilitates more accurate segmentation, or whether certain document regions that belong to a common object have been segmented into different fragments, which reduces the accuracy of the resulting page segmentation. Minimizing consistency loss encourages intra-region consistency within the unstructured vector graphics document.

For example, the training process uses rendering commands from a vector graphic document to minimize the consistency loss. The set of rendering commands present in a vector graphics document is useful for identifying bounding boxes around different document regions. For instance, rendering commands might indicate that two different document regions (e.g., a first region at the bottom of one column and a second region at the top of a different column) belong to the same object (e.g., a paragraph that breaks across the two columns). Thus, a common bounding box is applied to both document regions. A consistency loss function value is computed with respect to this bounding box (and other bounding boxes obtained from other rendering commands). The neural network is iteratively adjusted to minimize the consistency loss function value that is computed based on these bounding boxes. Doing so encourages pixels belonging to the same regions to have similar representation, and thereby reduces the likelihood that the page segmentation application 106 will classify an object as two different objects.

Figure 7:
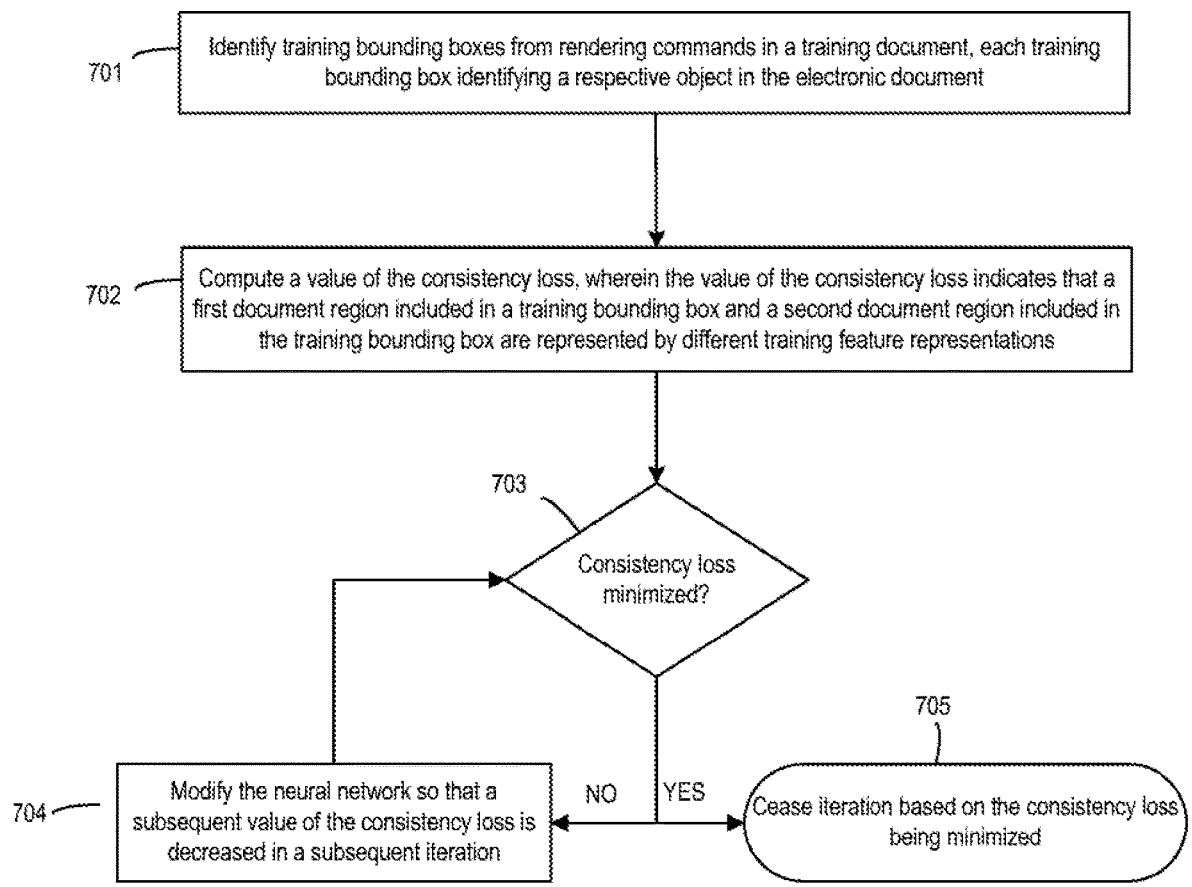
FIG. 7 depicts an example of a method for training a neural network to generate similar visual feature representations for document regions that correspond to a common object, in accordance with certain embodiments.

FIG. 7 depicts an example of a method 700 for training a neural network by minimizing a consistency loss function. In some embodiments, one or more processing devices implement operations depicted in FIG. 7 by executing suitable program code (e.g., the page segmentation application 106). For illustrative purposes, the method 700 is described with reference to various examples depicted herein. Other implementations, however, are possible.

At block 701, the method 700 involves identifying training bounding boxes from rendering commands in a training document, where each training bounding box identifies a respective object in the electronic document. The rendering command is used for obtaining bounding boxes around objects within the unstructured vector graphics document. The rendering commands provide information about the objects drawn on the page. For example, a rendering command might indicate how a text box is drawn. If, for example, a text box splits the text across two columns, and therefore potentially into two different regions on the page, the bounding box indicates that in fact the two columns are from the same object. Thus, a common bounding box is applied to both document regions, minimizing the risk that the text box is incorrectly split into two objects.

At block 702, the method 700 involves computing a value of the consistency loss, where the value of the consistency loss indicates that a first document region included in a training bounding box and a second document region included in the same training bounding box are represented by different training feature representations (i.e., that the feature representations are insufficiently similar). For example, a consistency task loss $L_{cons}$ is defined as follows. Let $p_{(i,j)}$ where i=1; 2; ... H; j=1; 2; ... W are activations at location (i,j) in a feature map of size C×H×W and b be the rectangular area in a bounding box. Each rectangular area b has a size $H_b \times W_b$. For each b ∈ B, $L_{cons}$ is given by:

$$L_{cons} = \frac{1}{H_b W_b} \sum_{(i,j) \in b} \|p_{(i,j)} - p^{(b)}\|_2^2$$

$$p^{(b)} = \frac{1}{H_b W_b} \sum_{(i,j) \in b} p_{(i,j)}$$

The consistency loss $L_{cons}$ is differentiable and is optimized using stochastic gradient descent. The gradient of $L_{cons}$ with respect to $p_{(i,j)}$ is:

$$\frac{\partial L_{cons}}{\partial p_{(i,j)}} = \frac{2}{H_b^2 W_b^2}(p_{(i,j)} - p^{(b)})(H_b W_b - 1) + \frac{2}{H_b^2 w_b^2} \sum_{\substack{(u,v) \in b \\ (u,v) \neq (i,j)}} (p^{(b)} - p_{(u,v)})$$

as $H_b W_b \gg 1$. But, in some embodiments, the gradient is approximated by $$\frac{\partial L_{cons}}{\partial p_{(i,j)}} \approx \frac{2}{H_b w_b}(p_{(i,j)} - p^{(b)}).$$

The unsupervised consistency loss, $L_{cons}$, as a loss layer, is evaluated within the neural network.

At block 703, the method 700 involves determining whether the consistency loss function is minimized. For example, a processing device executes the method 700 during training of a neural network. The processing device stores, in a memory device, output values that are computed from the consistency loss function at various iterations of the method 700. The processing device also stores, in the memory, data describing a particular configuration of the neural network that corresponds to a particular output value at a certain iteration. The processing device determines whether the consistency loss function is minimized by referencing this stored set of output values (e.g., by finding a minimum value from the set of stored output values).

If the consistency loss function is not minimized, then block 703 passes control to block 704 and method 700 continues to iterate. Conversely, if the consistency loss function is minimized, then block 703 passes control to block 705.

At block 704, the method 700 involves modifying the neural network so that a subsequent value of the consistency loss is decreased in a subsequent iteration. Adjusting the neural network includes one or more of adjusting the number of layers in the neural network, adjusting the number of nodes in a layer of the neural network, adjusting one or more weights in the neural network, etc.

At block 705, the method 700 involves ceasing the iteration based on the consistency loss being optimized. For example, the processing device that trains the neural network determines that a particular configuration of the neural network that resulted in the minimized consistency loss has been sufficiently trained, at least with respect to the consistency task. Thus, the training method 700 ceases based on the neural network having the optimized configuration that minimizes the consistency loss.

Creation of Suitable Training Data

As noted above, training data 116 is input to the page segmentation application 106 to improve the performance of the page segmentation application 106 and to train the neural networks. Training data 116, such as model unstructured vector graphics documents, could be automatically gathered from online or other sources.

The quality of the training data directly impacts the effectiveness of the training. In particular, one of the challenges in training fully convolutional networks is the need for pixel-wise ground truth data. Pixel-wise ground truth data includes a known correct object classification for each pixel within an electronic document 201. Some document training data sets could be limited by both small size and the lack of fine-grained semantic labels such as section headings, lists, or figure and table captions. In order for a page segmentation application 106 to properly be trained to identify small semantic labels, the neural networks must be trained with suitable data sets.

Additionally, a large amount of quality training data is required. Because real training data, e.g. electronic documents, does not always contain the desired feature granularity and pixel-wise ground truth data, efficient synthetic document generation might be required. An automated process is used to generate large-scale training data to train neural networks. In some embodiments, sets of synthetic data are used as training data 116 and provided to the page segmentation application 106, then sets of real (person-generated) training data is used as training data 116 and provided to the page segmentation application 106 in sequence.

Suitable training data is required to train a neural network. Training data 116 includes pixel-wise ground truth information that is used for verification. But identification of existing elements on the page, i.e., pixel-wise ground truth data, is time consuming to obtain. For example to obtain known correct classifications, a person would have to manually identify all objects within a PDF document.

In order to facilitate good testing, a diverse set of data is useful. But gathering training data is labor-intensive, therefore some strategies are disclosed herein to reduce the effort required, and to ensure good quality training data.

For example, existing unstructured vector graphics documents could be used. New unstructured vector graphics documents could also be generated from figures, text, etc. gathered from other sources. One way to accomplish diversity in training data 116 is by performing a random layout of the data. For example, LaTeX source files are generated in which paragraphs, figures, tables, captions, section headings and lists are randomly arranged to make up single, double, or triple-column unstructured vector graphics documents.

Figures might also be automatically generated. For example, figures are generated from academic-style figures and graphic drawings downloaded using web image search, or natural images from a source such as MSCOCO (mscoco.org). Such websites associate each image with several captions. Candidate tables are downloaded using web image search. In particular, specific queries are used to increase the diversity of downloaded tables within training data 116.

The training data 116 should contain text in order to properly train the neural networks. In particular, because the page segmentation model relies on the textual information to classify objects, the content of text regions (paragraph, section heading, list, caption) must be carefully selected. For example, for paragraphs, sample sentences are randomly selected from a dump of Wikipedia data. Section headings are generated by sampling sentences and phrases that are section or subsection headings in the "Contents" block in a Wikipedia page. Lists are generated by taking the data items from the same Wikipedia page. Captions use the caption associated with the corresponding image, e.g., for images from MSCOCO, or the title of the image in web image search.

To further increase the complexity of the generated document layouts, training data 116 with varied, complicated layouts are collected and labeled. For example, objects are varied within a document within the training data 116 in order to create training data 116. Each object is randomly replaced with a standalone paragraph, figure, table, caption, section heading or list generated as stated above.

Example of a Computing System for Performing a Page Segmentation

Figure 8:
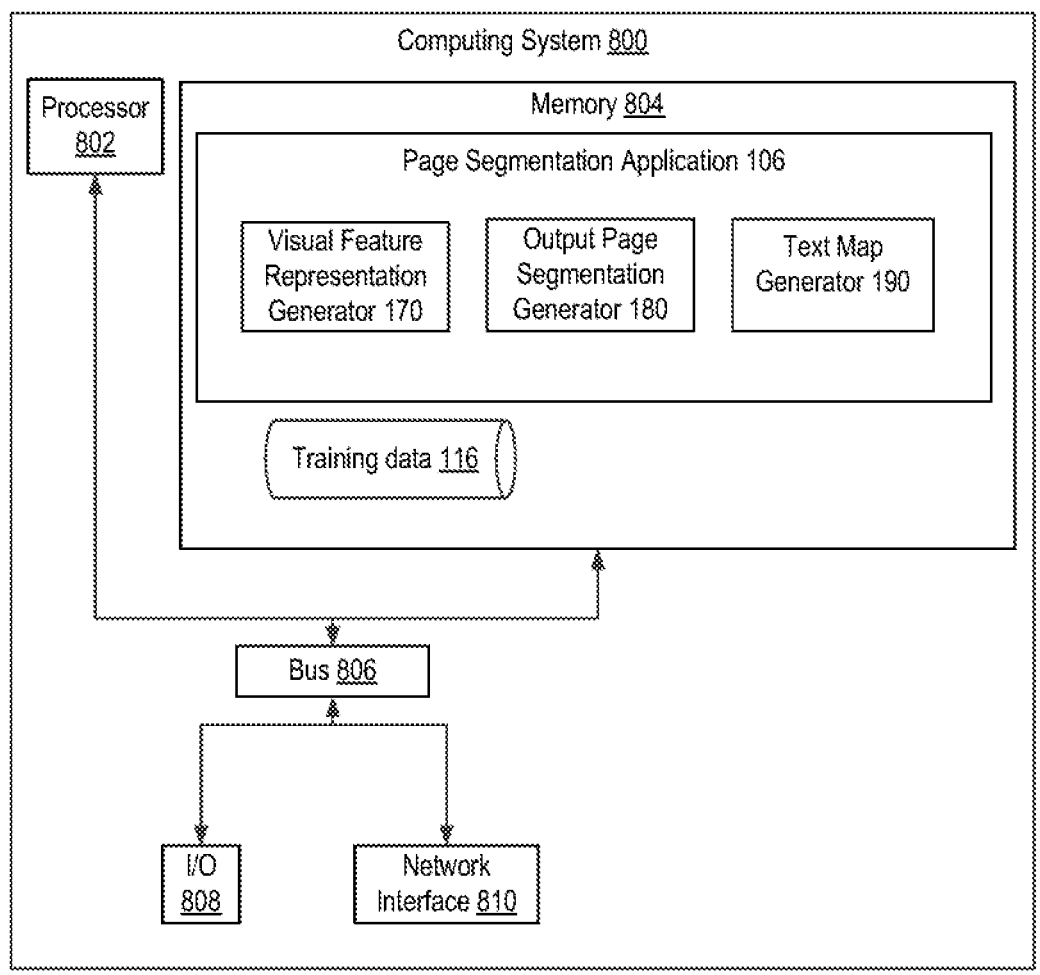
FIG. 8 depicts an example of a system environment for performing semantic page segmentation functions according to certain embodiments.

Any suitable computing system or group of computing systems is used for performing the operations described herein. For example, FIG. 8 depicts an example of a system environment for performing semantic page segmentation functions according to certain embodiments. In some embodiments, the computing system 800 also executes the page segmentation application 106, as depicted in FIG. 8. In other embodiments, a separate computing system having devices similar to those depicted in FIG. 8 (e.g., a processor, a memory, etc.) executes the page segmentation application 106.

The depicted example of a computing system 800 includes a processor 802 communicatively coupled to one or more memory devices 804. The processor 802 executes computer-executable program code stored in a memory device 804, accesses information stored in the memory device 804, or both. Examples of the processor 802 include a microprocessor, an application-specific integrated circuit ("ASIC"), a field-programmable gate array ("FPGA"), or any other suitable processing device. The processor 802 can include any number of processing devices, including a single processing device.

The memory device 804 includes any suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions might include processor-specific instructions generated by a compiler or an interpreter from code written in any suitable computer-programming language, including, for example, C, C++, C #, Visual Basic, Java, Python, Perl, JavaScript, and ActionScript.

The computing system 800 might also include a number of external or internal devices, such as input or output devices. For example, the computing system 800 is shown with one or more input/output ("I/O") interfaces 808. An I/O interface 808 can receive input from input devices or provide output to output devices. One or more busses 806 are also included in the computing system 800. The bus 806 communicatively couples one or more components of a respective one of the computing system 800.

The computing system 800 executes program code that configures the processor 802 to perform one or more of the operations described herein. The program code includes, for example, the page segmentation application 106, or other suitable applications that perform one or more operations described herein. The program code can be resident in the memory device 804 or any suitable computer-readable medium and can be executed by the processor 802 or any other suitable processor. In some embodiments, the page segmentation application 106 is stored in the memory device 804, as depicted in FIG. 8. In additional or alternative embodiments, one or more of the page segmentation application 106, the output page segmentation generator 180, the text mapping generator 190, or the visual feature representation generator 170 are stored in different memory devices of different computing systems. In additional or alternative embodiments, the program code described above is stored in one or more other memory devices accessible via a data network.

The computing system 800 can access one or more of the training data 116 and the page segmentation application 106 in any suitable manner. In some embodiments, some or all of one or more of these data sets, models, and functions are stored in the memory device 804, as in the example depicted in FIG. 8. For example, a computing system 800 that executes the visual feature representation generator 170, the output page segmentation generator 180, or the text mapping generator 190 can provide access to the training data 116 by external systems that execute the page segmentation application 106.

In additional or alternative embodiments, one or more of these data sets, models, and functions are stored in the same memory device (e.g., one of the memory device 804). For example, a common computing system, such as the creative apparatus 104 depicted in FIG. 1, can host the page segmentation application 106, the visual feature representation generator 170, the output page segmentation generator 180, or the text map generator 190. In additional or alternative embodiments, one or more of the programs, data sets, models, and functions described herein are stored in one or more other memory devices accessible via a data network.

The computing system 800 also includes a network interface device 810. The network interface device 810 includes any device or group of devices suitable for establishing a wired or wireless data connection to one or more data networks. Non-limiting examples of the network interface device 810 include an Ethernet network adapter, a modem, and the like. The computing system 800 is able to communicate with one or more other computing devices (e.g., a computing device executing the page segmentation application 106) via a data network using the network interface device 810.

General Considerations

Numerous specific details are set forth herein to provide a thorough understanding of the claimed subject matter. However, those skilled in the art will understand that the claimed subject matter can be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical, electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages can be used to implement the teachings contained herein in software to be used in programming or configuring a computing device.

Embodiments of the methods disclosed herein can be performed in the operation of such computing devices. The order of the blocks presented in the examples above is varied—for example, blocks are re-ordered, combined, or broken into sub-blocks. Certain blocks or processes are performed in parallel.

The use of "adapted to" or "configured to" herein is meant as open and inclusive language that does not foreclose devices adapted to or configured to perform additional tasks or operations. Additionally, the use of "based on" is meant to be open and inclusive, in that a process, operation, calculation, or other action "based on" one or more recited conditions or values can, in practice, be based on additional conditions or values beyond those recited. Headings, lists, and numbering included herein are for ease of explanation only and are not meant to be limiting.

While the present subject matter has been described in detail with respect to specific embodiments thereof, those skilled in the art, upon attaining an understanding of the foregoing, can readily produce alterations to, variations of, and equivalents to such embodiments. Accordingly, the present disclosure has been presented for purposes of example rather than limitation, and does not preclude the inclusion of such modifications, variations, or additions to the present subject matter as would be readily apparent to one of ordinary skill in the art.

The invention claimed is:

1. A method for classifying text regions of an electronic document into document object types, the method comprising:

providing, to a neural network executed by a processing device and to generate an output page segmentation of the electronic document, a textual feature representation that represents, in a vector space, a semantic meaning of textual content within an electronic document and a visual feature representation that includes a feature vector representing visual characteristics of a set of pixels of the electronic document that depict the textual content;

identifying, by the processing device, a correspondence between a location of the set of pixels in the electronic document and a location of a particular document object type in the output page segmentation, wherein the particular document object type: (i) is classified by the neural network based on the textual feature representation and the visual feature representation; and (ii) identifies a predicted type of a document element within a layout of the electronic document; and outputting, by the processing device, a classification of the set of pixels as being the particular document object type based on the identified correspondence.

2. The method of claim 1, wherein the classification of the set of pixels represents a plurality of different document object types that comprises two or more of: a table object type, a paragraph object type, and a caption object type.

3. The method of claim 1, further comprising:
identifying, by the processing device, training bounding boxes from rendering commands in a training document, each training bounding box identifying a respective object in the electronic document; and
iteratively adjusting the neural network based on a consistency loss computed from training feature representations in a training document.

4. The method of claim 3, wherein iteratively adjusting the neural network comprises:
computing a value of the consistency loss, wherein the value of the consistency loss indicates that a first document region included in a training bounding box and a second document region included in the training bounding box are represented by different training feature representations;
modifying the neural network such that a subsequent value of the consistency loss is decreased in a subsequent iteration; and
ceasing iteration based on the consistency loss being minimized.

5. The method of claim 1, wherein the neural network is trained with a set of training documents, the method further comprising:
receiving a human-generated sentence;
receiving a human-generated section heading;
receiving a human-generated list comprising elements from a common source;
receiving a human-generated caption; and
creating a training document by inserting at least one of a paragraph, a sentence, a section heading, or a caption into a human-generated unstructured vector graphics document.

6. The method of claim 1, further comprising generating the visual feature representation by applying a first portion of a neural network to the electronic document, wherein the output page segmentation is generated by applying a second portion of the neural network to the textual feature representation and the visual feature representation, wherein an output of the second portion of the neural network is a raw page segmentation, wherein generating the output page segmentation comprises transforming the raw page segmentation into the output page segmentation by performing operations comprising:
identifying a first segmentation portion of the raw page segmentation that corresponds to the particular document object type and a second segmentation portion of the raw page segmentation that corresponds to a different document object type;
identifying, from rendering commands in the electronic document, a common bounding box that includes locations in the electronic document corresponding to the first segmentation portion and the second segmentation portion;
determining that the first segmentation portion is larger than the second segmentation portion; and
modifying the raw page segmentation based on the first segmentation portion being larger than the second segmentation portion and the common bounding box having locations corresponding to the first and second segmentation portions, wherein modifying the raw page segmentation causes both the first segmentation portion and the second segmentation portion to correspond to the particular document object type.

7. The method of claim 6, the operations further comprising:
identifying a third segmentation portion of the raw page segmentation that corresponds to the particular document object type or the different document object type;
determining that the third segmentation portion corresponds to a third location in the electronic document that is outside the common bounding box; and
modifying the raw page segmentation based on the third segmentation portion corresponding to the third location, wherein modifying the raw page segmentation causes the third segmentation portion to correspond to a background object type.

8. A system comprising:
a non-transitory computer-readable medium storing computer-executable instructions for categorizing text regions of an electronic document into document object types; and
a processor communicatively coupled to the non-transitory computer-readable medium for executing the computer-executable instructions, wherein executing the computer-executable instructions configures the processor to perform operations comprising:
providing, to a neural network, a textual feature representation that represents, in a vector space, a semantic meaning of textual content within an electronic document and a visual feature representation that includes a feature vector representing visual characteristics of a set of pixels of the electronic document that depict the textual content, thereby generating an output page segmentation of the electronic document;
identifying, in the output page segmentation, a correspondence between a location of the set of pixels in the electronic document and a location of a particular document object type, wherein the particular document object type: (i) is classified by the neural network based on the textual feature representation and the visual feature representation; and (ii) identifies a predicted type of a document element within a layout of the electronic document; and
outputting a classification of the set of pixels as being the particular document object type based on the identified correspondence.

9. The system of claim 8, wherein the classification of the set of pixels represents a plurality of different document object types that comprises one or more of: a table object type, a paragraph object type, and a caption object type.

10. The system of claim 8, the operations further comprising:
identifying training bounding boxes from rendering commands in a training document, each training bounding box identifying a respective object in the electronic document; and
iteratively adjusting the neural network based on a consistency loss computed from training feature representations in a training document, wherein iteratively adjusting the neural network comprises:
computing a value of the consistency loss, wherein the value of the consistency loss indicates that a first document region included in a training bounding box and a second document region included in the training bounding box are represented by different training feature representations;
modifying the neural network such that a subsequent value of the consistency loss is decreased in a subsequent iteration; and
ceasing iteration based on the consistency loss being minimized.

11. The system of claim 8, wherein the neural network is trained with a set of training documents, the operations further comprising:
receiving a human-generated sentence;
receiving a human-generated section heading;
receiving a human-generated list comprising elements from a common source;
receiving a human-generated caption; and
creating a training document by inserting at least one of a paragraph, a sentence, a section heading, or a caption into a human-generated unstructured vector graphics document.

12. The system of claim 8, the operations further comprising generating the visual feature representation by applying a first portion of a neural network to the electronic document, wherein the output page segmentation is generated by applying a second portion of the neural network to the textual feature representation and the visual feature representation, wherein an output of the second portion of the neural network is a raw page segmentation.

13. The system of claim 12, wherein generating the output page segmentation comprises transforming the raw page segmentation into the output page segmentation by performing operations comprising:
identifying a first segmentation portion of the raw page segmentation that corresponds to the particular document object type and a second segmentation portion of the raw page segmentation that corresponds to a different document object type;
identifying, from rendering commands in the electronic document, a common bounding box that includes locations in the electronic document corresponding to the first segmentation portion and the second segmentation portion;
determining that the first segmentation portion is larger than the second segmentation portion; and
modifying the raw page segmentation based on the first segmentation portion being larger than the second segmentation portion and the common bounding box having locations corresponding to the first and second segmentation portions, wherein modifying the raw page segmentation causes both the first segmentation portion and the second segmentation portion to correspond to the particular document object type.

14. The system of claim 13, the operations further comprising:
identifying a third segmentation portion of the raw page segmentation that corresponds to the particular document object type or the different document object type;
determining that the third segmentation portion corresponds to a third location in the electronic document that is outside the common bounding box; and
modifying the raw page segmentation based on the third segmentation portion corresponding to the third location, wherein modifying the raw page segmentation causes the third segmentation portion to correspond to a background object type.

15. The system of claim 8, wherein the neural network comprises:
a set of encoder blocks followed by a set of decoder blocks trained to output the visual feature representation, wherein the set of encoder blocks and the set of decoder blocks are included in a first portion of the neural network;
an additional decoder block that receives, as a first input, the visual feature representation outputted from the set of decoder blocks, wherein the additional decoder block is included in a second portion of the neural network; and
a bridge connection that provides the textual feature representation from a text map generator to the additional decoder block as a second input.

16. A non-transitory computer-readable storage medium storing computer-executable program instructions, wherein when executed by a processing device, the computer-executable program instructions cause the processing device to perform operations comprising:
a step for providing, to a neural network to generate an output page segmentation of an electronic document, a textual feature representation that represents, in a vector space, a semantic meaning of textual content within an electronic document and a visual feature representation that includes a feature vector representing visual characteristics of a set of pixels of the electronic document that depict the textual content;
a step for receiving, from the neural network, a correspondence between a location of the set of pixels in the electronic document and a location of a particular document object type in the output page segmentation, wherein the particular document object type: (i) is classified by the neural network based on the textual feature representation and the visual feature representation; and (ii) identifies a predicted type of a document element within a layout of the electronic document; and
a step for outputting a classification of the set of pixels to a user device.

17. The non-transitory computer-readable storage medium of claim 16, wherein the classification of the set of pixels represents a plurality of different document object types that comprises two or more of: a table object type, a paragraph object type, and a caption object type.

18. The non-transitory computer-readable storage medium of claim 16, the operations further comprising:
a step for identifying training bounding boxes from rendering commands in a training document, each training bounding box identifying a respective object in the electronic document; and
a step for iteratively adjusting the neural network based on a consistency loss computed from training feature representations in a training document, wherein iteratively adjusting the neural network comprises:
a step for computing a value of the consistency loss;
a step for modifying the neural network such that a subsequent value of the consistency loss is decreased in a subsequent iteration; and
a step for ceasing iteration when the consistency loss is below a threshold.

19. The non-transitory computer-readable storage medium of claim 16, wherein the neural network is trained with a set of training documents, the operations further comprising a step for creating a training document by inserting at least one of a paragraph, a sentence, a section heading, or a caption into a human-generated unstructured vector graphics document.

20. The non-transitory computer-readable storage medium of claim 16, the operations further comprising generating the visual feature representation by applying a first portion of a neural network to the electronic document, wherein the output page segmentation is generated by applying a second portion of the neural network to the textual feature representation and the visual feature representation, wherein an output of the second portion of the neural network is a raw page segmentation.

* * * * *